US012594997B2

(12) United States Patent
Song et al.

(10) Patent No.: US 12,594,997 B2
(45) Date of Patent: Apr. 7, 2026

(54) SIDE REINFORCING STRUCTURE OF VEHICLE BODY

(71) Applicants: Hyundai Motor Company, Seoul (KR); Kia Corporation, Seoul (KR)

(72) Inventors: Won Ki Song, Seongnam-si (KR); Jung Jong Chun, Seoul (KR); Yeongjae Kim, Seoul (KR); Heedae Oh, Suwon-si (KR); Joon Tak Park, Gunpo-si (KR); Seokju Gim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 402 days.

(21) Appl. No.: 18/337,221

(22) Filed: Jun. 19, 2023

(65) Prior Publication Data

US 2024/0092428 A1     Mar. 21, 2024

(30) Foreign Application Priority Data

Sep. 15, 2022    (KR) ......................... 10-2022-0116649

(51) Int. Cl.
| | |
|---|---|
| *B62D 21/15* | (2006.01) |
| *B60J 1/17* | (2006.01) |
| *B60J 10/76* | (2016.01) |
| *B62D 25/04* | (2006.01) |
| *B62D 25/06* | (2006.01) |
| *B62D 27/02* | (2006.01) |

(52) U.S. Cl.
CPC .............. *B62D 21/157* (2013.01); *B60J 1/17* (2013.01); *B60J 10/76* (2016.02); *B62D 25/04* (2013.01); *B62D 25/06* (2013.01); *B62D 27/02* (2013.01)

(58) Field of Classification Search
CPC ........ B62D 27/02; B62D 25/06; B62D 25/04; B62D 25/02; B62D 21/157; B60Y 2410/124; B60Y 2306/01; B60J 10/76; B60J 10/74; B60J 1/17
See application file for complete search history.

(56) References Cited

FOREIGN PATENT DOCUMENTS

| | | | |
|---|---|---|---|
| CN | 1486901 A * | 4/2004 | |
| JP | 2014046871 A | 3/2014 | |
| JP | 5766030 B2 | 8/2015 | |
| KR | 101740923 B1 | 6/2017 | |
| KR | 20220082546 A * | 6/2022 | |

* cited by examiner

*Primary Examiner* — Lori Lyjak
(74) *Attorney, Agent, or Firm* — Slater Matsil, LLP

(57) ABSTRACT

An embodiment side reinforcing structure includes a front pillar, a rear pillar, and a glass run lower inner reinforcement connecting the front pillar and the rear pillar. An embodiment vehicle includes a vehicle body including a front pillar and a rear pillar, a glass run lower inner reinforcement extending along a length direction of the vehicle body and connecting the front pillar and the rear pillar, a glass mounted on a side of the vehicle body between the front pillar and the rear pillar and above the glass run lower inner reinforcement, and a regulator extending in a vehicle height direction and comprising an upper mounting portion and a lower mounting portion, wherein the regulator is connected to the glass run lower inner reinforcement through the upper mounting portion, and wherein the regulator is configured to move the glass vertically.

20 Claims, 14 Drawing Sheets

SIDE REINFORCING STRUCTURE OF VEHICLE BODY

CROSS-REFERENCE TO RELATED APPLICATIONS

This application claims the benefit of Korean Patent Application No. 10-2022-0116649, filed on Sep. 15, 2022, which application is hereby incorporated herein by reference.

TECHNICAL FIELD

The present invention relates to a vehicle body structure.

BACKGROUND

Recently, the vehicle industry is introducing a new concept of future mobility vision for realizing a human-centered, dynamic future city. One of these future mobility solutions is a purpose built vehicle (PBV) as a purpose-based mobility.

A PBV is an electric vehicle-based (EV) environment-friendly vehicle that provides various customized services to users. The vehicle body of such a PBV includes an under body (also referred to as a rolling chassis or a skateboard in the art) and an upper body assembled to the under body.

Here, the upper body may be configured in various forms according to the type of customized service of the PBV. For example, a PBV has only one door in front of the vehicle, and the passenger seat does not have a door, so the vehicle body can be configured more economically.

However, even if a door is not applied to the front passenger seat, it is necessary to apply a power window or electric window for occupant convenience.

The above information disclosed in this background section is only for enhancement of understanding of the background of embodiments of the invention, and therefore it may contain information that does not form the prior art that is already known to a person of ordinary skill in the art.

SUMMARY

The present invention relates to a vehicle body structure. Particular embodiments relate to a side reinforcing structure of a vehicle body that reinforces a side portion of a vehicle body.

Embodiments of the present invention provide a side reinforcing structure of a vehicle body applying a power window or electric window to an assistant seat to which a door is not applied.

A side reinforcing structure according to an exemplary embodiment of the present invention may include a front pillar, a rear pillar, and a glass run lower inner reinforcement connecting the front pillar and the rear pillar.

The side reinforcing structure according to an exemplary embodiment of the present invention may further include a regulator including an upper mounting portion and connected to the glass run lower inner reinforcing portion through the upper mounting portion.

The glass run lower inner reinforcement may include a lower inner reinforcement body connecting the front pillar and the rear pillar, an inner reinforcement body bending portion formed by bending from the lower inner reinforcement body, and a regulator mounting part formed on the lower inner reinforcement body and the inner reinforcement body bending portion so that the upper mounting portion is mounted.

The glass run lower inner reinforcement may further include an inner reinforcement front flange and an inner reinforcement rear flange connected with the front pillar and the rear pillar, respectively.

The side reinforcing structure according to an exemplary embodiment of the present invention may further include a glass run lower outer reinforcement disposed parallel to the glass run lower inner reinforcement, forming a glass passage between the glass run lower inner reinforcement and connecting the front pillar and the rear pillar.

The side reinforcing structure according to an exemplary embodiment of the present invention may further include a glass lower sealing inserted between the glass run lower inner reinforcement and the glass run lower outer reinforcement.

The side reinforcing structure according to an exemplary embodiment of the present invention may further include a glass run upper reinforcement that connects the front pillar and the rear pillar and is connected with the glass run lower inner reinforcement and the glass run lower outer reinforcement.

The glass run upper reinforcement may have a "U"-shaped cross-section shape including an upper reinforcement inner body and an upper reinforcement outer body bent from the upper reinforcement inner body so that the glass is inserted therein.

The side reinforcing structure according to an exemplary embodiment of the present invention may further include a glass upper sealing mounted on the upper reinforcement outer body.

The side reinforcing structure according to an exemplary embodiment of the present invention may further include a roof rail side disposed on an upper portion of the vehicle body along the vehicle body length direction, and the inner body of the glass run upper reinforcement may be connected to a lower surface of the roof rail side by welding.

The front pillar may include a front pillar rear surface formed toward the rear of the vehicle body, the rear pillar may include a rear pillar front surface formed toward the front of the vehicle body, and the inner body of the glass run upper reinforcement may be welded to the front pillar rear surface and the rear pillar front surface.

The glass run lower inner reinforcement and the glass run lower outer reinforcement may be welded to the upper reinforcement outer body.

The regulator may include a lower mounting portion, and the side reinforcing structure of the vehicle body may further include a regulator lower reinforcement connecting the front pillar and the rear pillar and mounting the lower mounting portion thereto.

The front pillar may include a front pillar inner flange formed along the length direction of the vehicle body and a front pillar rear surface formed toward the rear of the vehicle body, and the rear pillar may include a rear pillar inner flange formed along the length direction of the vehicle body and a rear pillar front surface formed toward the front of the vehicle body.

The regulator lower reinforcement may include a regulator lower reinforcement body connected to the front pillar inner flange and the rear pillar inner flange by welding and a regulator lower reinforcement front flange and a regulator lower reinforcement rear flange that are bent from the regulator lower reinforcement body and connected to the front pillar rear surface and the rear pillar front surface by welding, respectively.

According to the side reinforcing structure of the vehicle body according to an exemplary embodiment of the present invention, the power window or electric window is applied to the auxiliary seat to which the door is not applied, and the parts constituting the power window or electric window can reinforce the side portion of the vehicle body.

The regulator body can be combined with the glass run lower reinforcement and the regulator lower reinforcement to improve vertical direction joint strength.

In addition, the effects that can be obtained or predicted due to the embodiments of the present invention will be directly or implicitly disclosed in the detailed description of the embodiments of the present invention. That is, various effects expected according to embodiments of the present invention will be disclosed within the detailed description to be described later.

BRIEF DESCRIPTION OF THE DRAWINGS

Since these drawings are for reference in explaining exemplary embodiments of the present invention, the technical idea of the present invention should not be construed as limited to the accompanying drawings.

DETAILED DESCRIPTION OF ILLUSTRATIVE EMBODIMENTS

Figure 1:
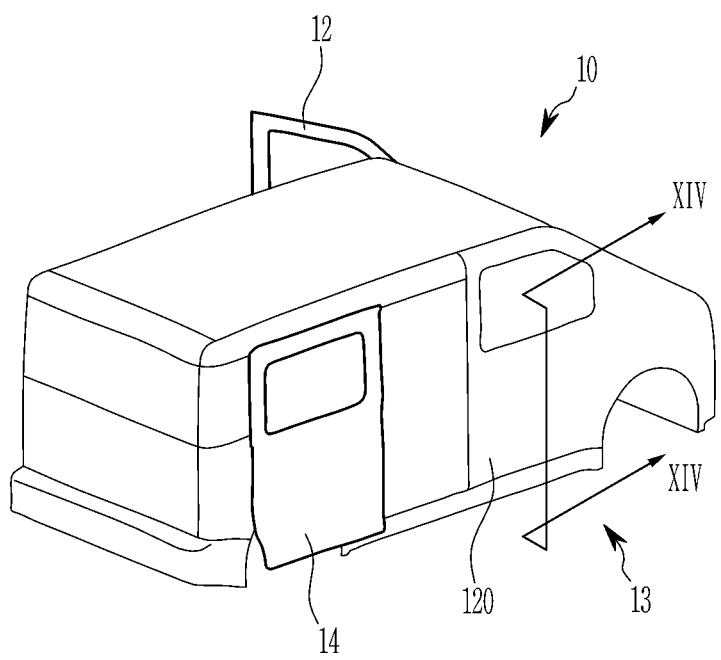
FIG. 1 is a perspective view of a vehicle body to which a side reinforcing structure of a vehicle body according to an exemplary embodiment of the present invention may be applied.

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly describe embodiments of the present invention, parts irrelevant to the description are omitted, and the same reference numerals are assigned to the same or similar components throughout the specification.

Since the size and thickness of each component shown in the drawings are arbitrarily shown for convenience of explanation, embodiments of the present invention are not necessarily limited to those shown in the drawings, and the thickness is enlarged to clearly express various parts and regions.

And, in the following detailed description, the names of the components are divided into first, second, etc. to classify them based on the relationship between the components, and the order is not necessarily limited in the following description.

Throughout the specification, when a part includes a certain component, this means that it may further include other components without excluding other components unless otherwise stated.

In addition, terms such as . . . part and . . . means described in the specification mean a comprehensive unit of configuration that performs at least one function or operation.

In addition, when an element is referred to as being "on" another element, there may be an intervening element present.

In contrast, when an element is referred to as being "directly on" another element, there are no intervening elements present.

Exemplary embodiments of the present invention will hereinafter be described in detail with reference to the accompanying drawings.

FIG. 1 is a perspective view of a vehicle body to which a side reinforcing structure of a vehicle body according to an exemplary embodiment of the present invention may be applied.

Referring to FIG. 1, a vehicle body 10 to which a side reinforcing structure according to an exemplary embodiment of the present invention may be applied includes a front door 12, and a sliding door 14 may be mounted in a direction opposite to the direction in which the front door 12 is mounted.

The vehicle body 10 may be a doorless vehicle body 10 without a door at a passenger seat 13 in front of the sliding door 14.

The front side of the passenger seat 13 has no door, but it is necessary to apply a power window or electric window for occupant comfort.

Figure 2:
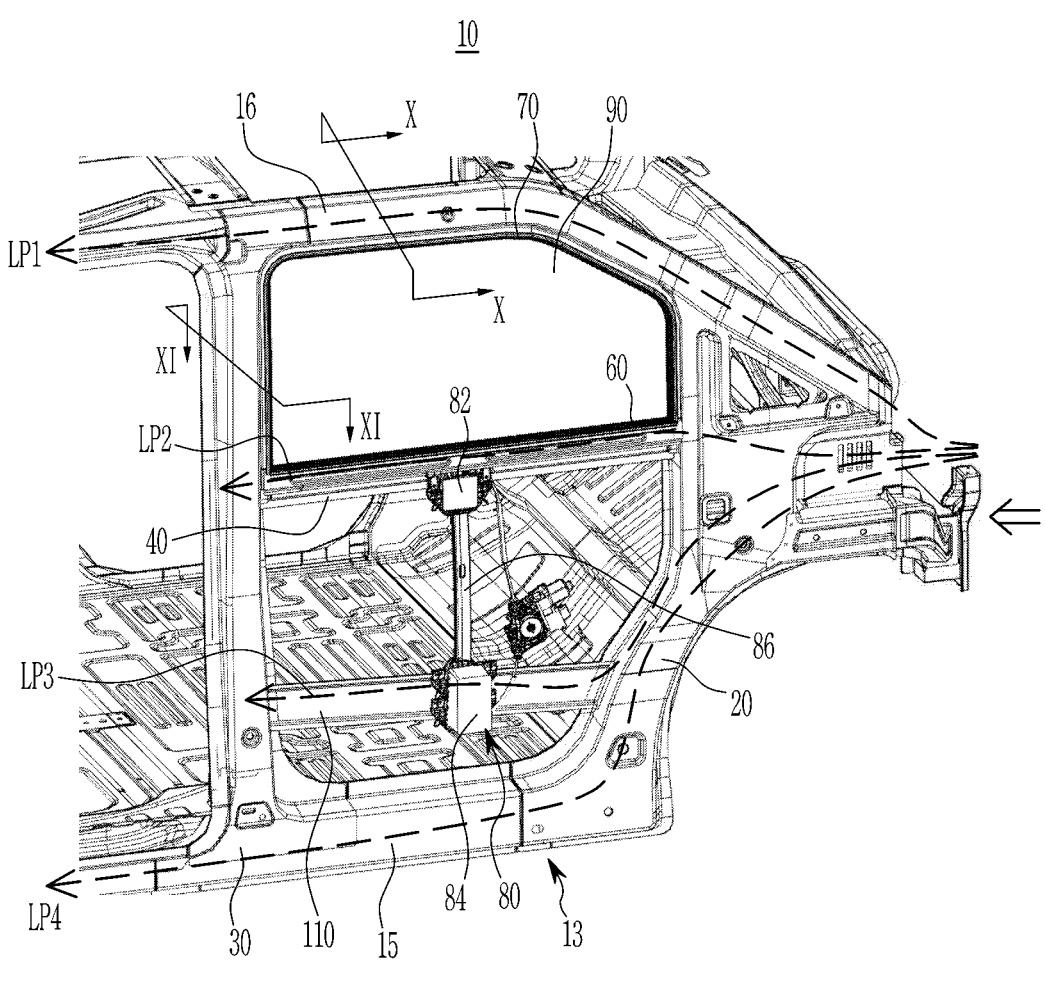
FIG. 2 and FIG. 3 are partial perspective views of a vehicle body to which the side reinforcing structure of a vehicle body according to an exemplary embodiment of the present invention may be applied.
Figure 3:
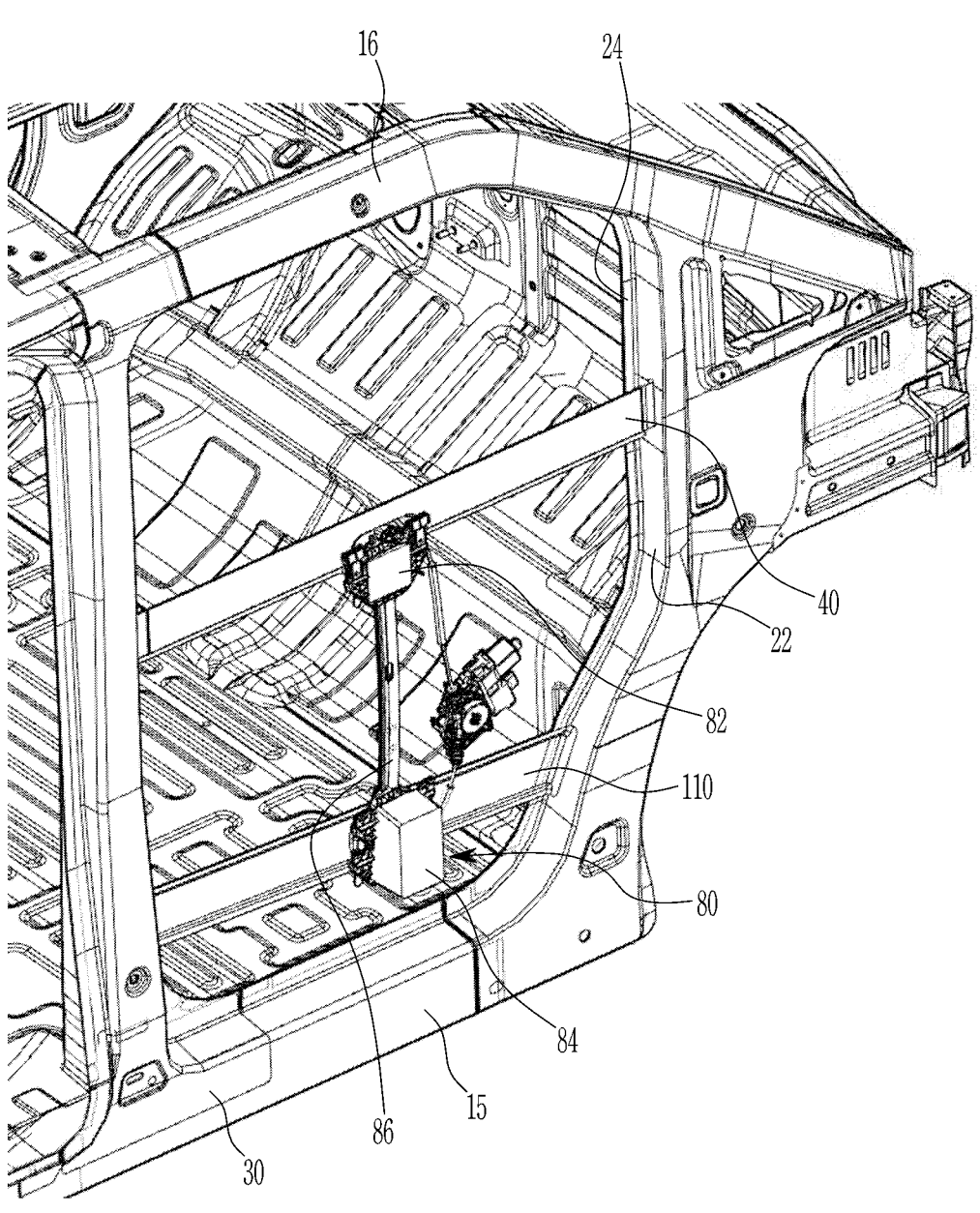
Figure 4:
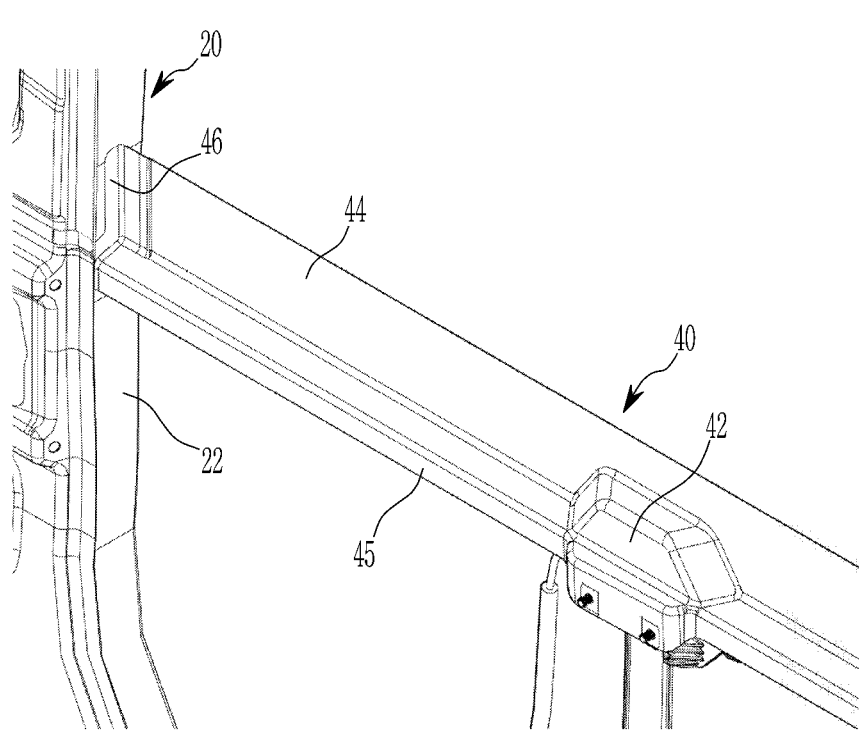
FIG. 4 and FIG. 5 are partial perspective views from the inside of the vehicle body to which the side reinforcing structure of the vehicle body according to an exemplary embodiment of the present invention may be applied.
Figure 5:
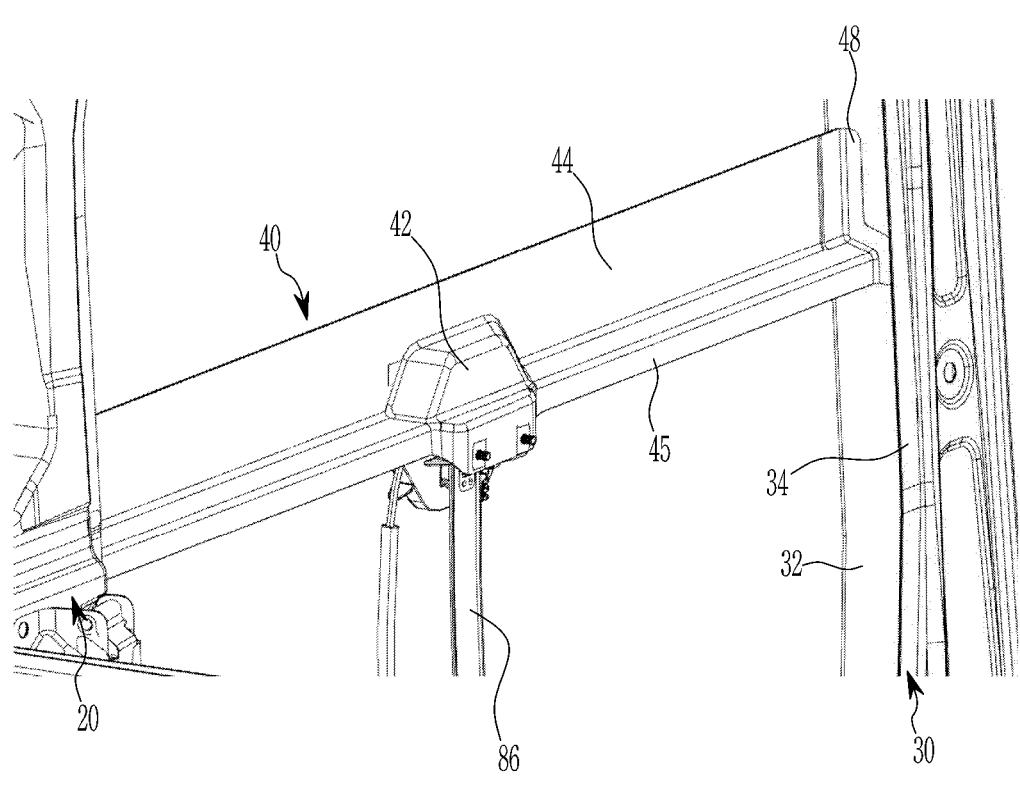

FIG. 2 and FIG. 3 are partial perspective views of a vehicle body to which the side reinforcing structure of a vehicle body according to an exemplary embodiment of the present invention may be applied, and FIG. 4 and FIG. 5 are partial perspective views from the inside of the vehicle body to which the side reinforcing structure of the vehicle body according to an exemplary embodiment of the present invention may be applied.

Referring to FIG. 1 to FIG. 5, the side reinforcement structure of the vehicle body 10 according to an exemplary embodiment of the present invention may include a front pillar 20, a rear pillar 30, and a glass run lower inner reinforcement 40 connecting the front pillar 20 and the rear pillar 30.

The glass run lower inner reinforcement 40 may increase the strength of the side of the vehicle body 10 by connecting the front pillar 20 and the rear pillar 30.

That is, the glass run lower inner reinforcement 40 is disposed along the length direction of the vehicle body 10 to increase the strength of the connection between the front pillar 20 and the rear pillar 30 and may prevent penetration of external materials into the occupant seat in the event of a vehicle side collision.

The side reinforcing structure of the vehicle body according to an exemplary embodiment of the present invention may further include a regulator 80 including an upper mounting portion 82 and connected to the glass run lower inner reinforcement 40 through the upper mounting portion 82.

The regulator 80 is configured to move a glass 90 of the passenger seat 13 in the vertical direction and is mounted on the glass run lower inner reinforcement 40 connecting the front pillar 20 and the rear pillar 30 to reduce the number of parts.

The glass run lower inner reinforcement 40 includes a lower inner reinforcement body 44 connecting the front pillar 20 and the rear pillar 30 and an inner reinforcement body bending portion 45 formed by bending from the lower inner reinforcement body 44.

The lower inner reinforcement body 44 is connected to the front pillar 20 and the rear pillar 30 to increase the connection strength of the front pillar 20 and the rear pillar 30.

The inner reinforcement body bending portion 45 is formed by bending from the lower inner reinforcement body 44 to increase the strength of the glass run lower inner reinforcement 40.

The glass run lower inner reinforcement 40 includes a regulator mounting part 42 formed on the lower inner reinforcement body 44 and the inner reinforcement body bending portion 45 so that the upper mounting portion 82 is mounted.

The regulator mounting part 42 is formed on the lower inner reinforcement body 44 and the inner reinforcement body bending portion 45 so that strength may be increased, and the regulator 80 may be stably supported with a stepped shape.

The glass run lower inner reinforcement 40 may include an inner reinforcement front flange 46 and an inner reinforcement rear flange 48 connected with the front pillar 20 and the rear pillar 30, respectively.

The inner reinforcement front flange 46 and the inner reinforcement rear flange 48 are bent at the lower inner reinforcement body 44 and the inner reinforcement body bending portion 45 so that the strength of both ends of the glass run lower inner reinforcement 40 may be increased.

For example, the inner reinforcement front flange 46 and the inner reinforcement rear flange 48 may be connected with the front pillar 20 and the rear pillar 30 by welding.

Figure 6:
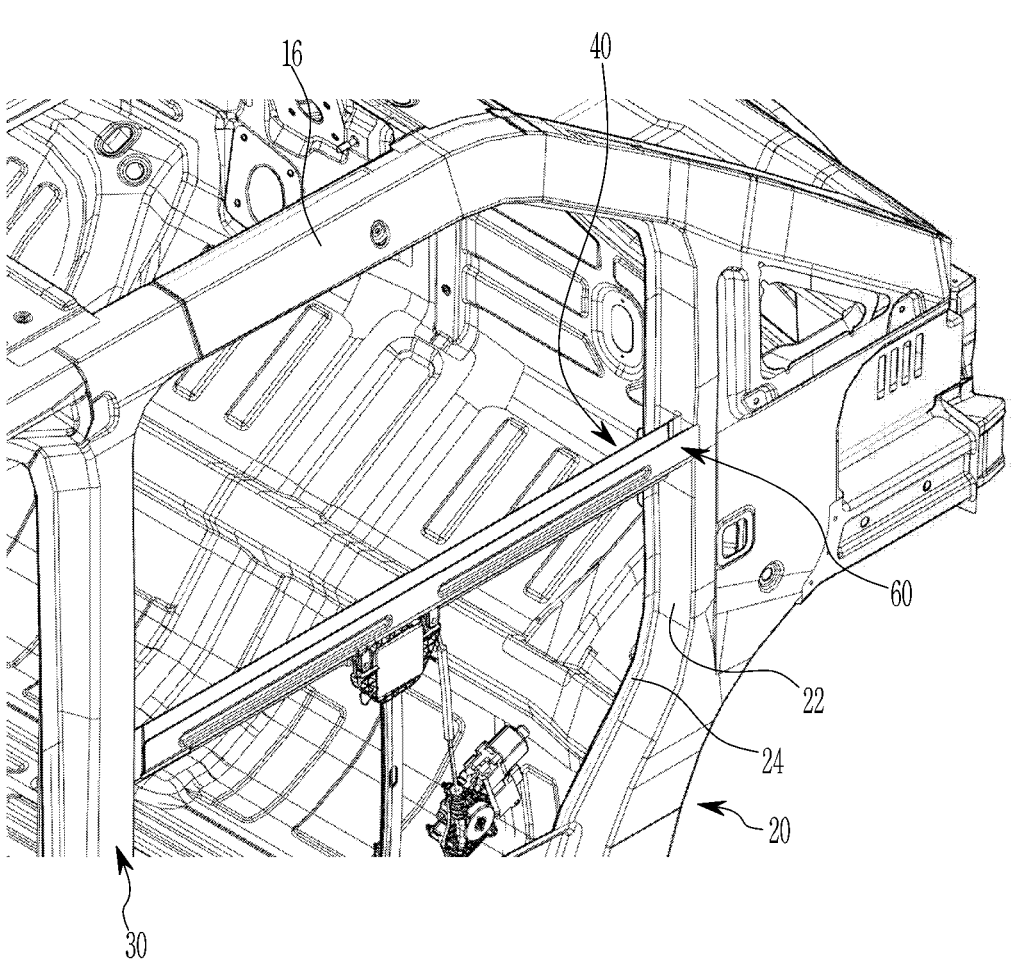
FIG. 6 and FIG. 7 are partial perspective views from the outside of the vehicle body to which the side reinforcing structure of the vehicle body according to an exemplary embodiment of the present invention may be applied.
Figure 7:
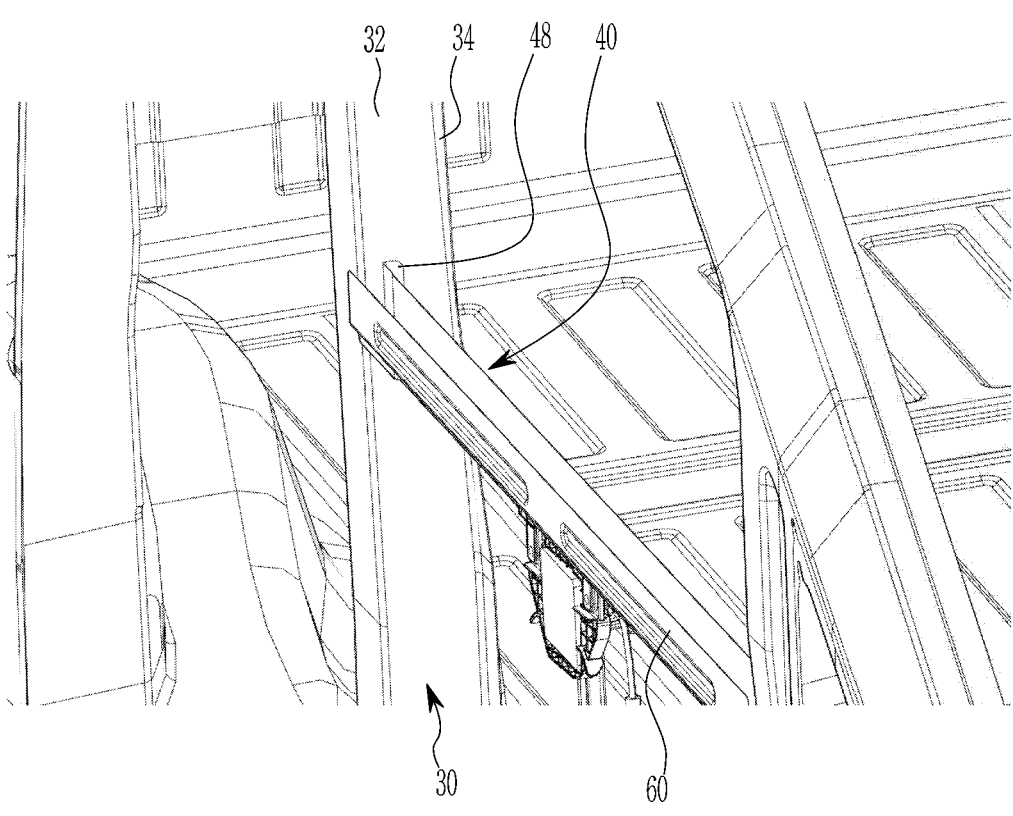

FIG. 6 and FIG. 7 are partial perspective views from the outside of the vehicle body to which the side reinforcing structure of the vehicle body according to an exemplary embodiment of the present invention may be applied.

Figure 8:
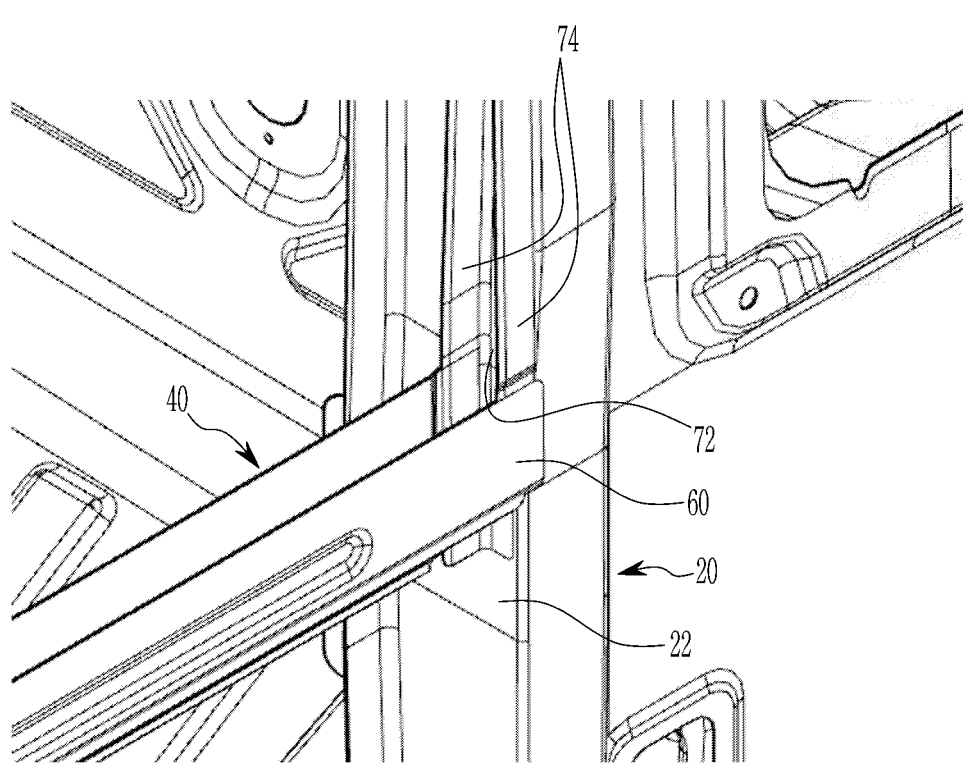
FIG. 8 is a perspective view showing a front pillar and a glass run lower inner reinforcement part of the side reinforcement structure of the vehicle body according to an exemplary embodiment of the present invention.
Figure 9:
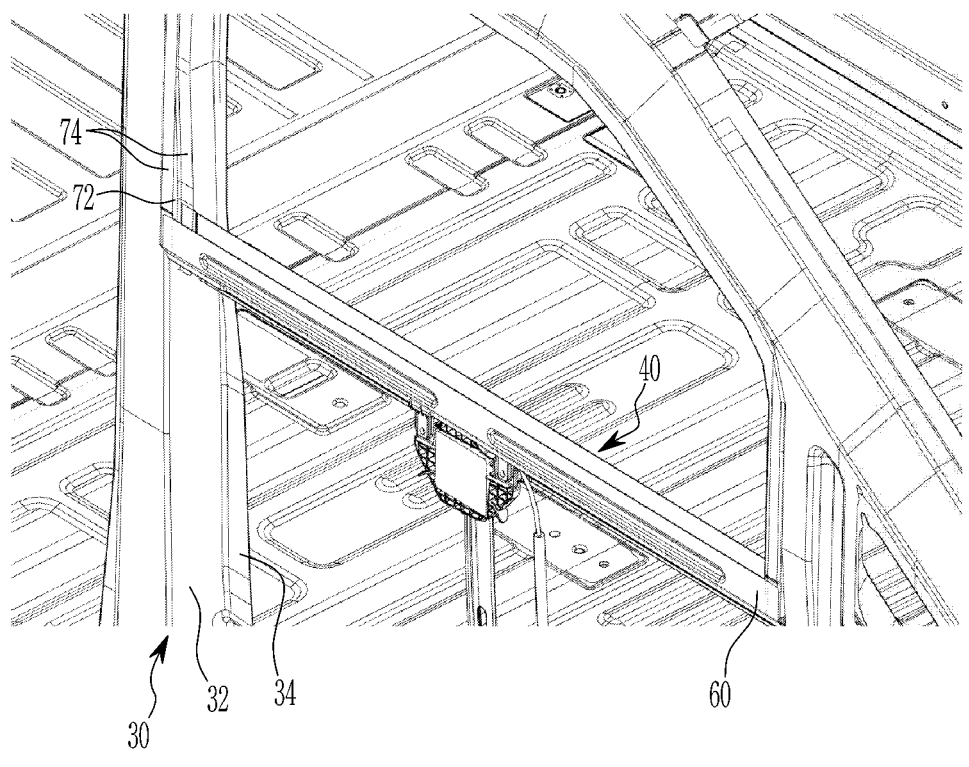
FIG. 9 is a perspective view showing a rear pillar and the glass run lower inner reinforcement part of the side reinforcement structure of the vehicle body according to an exemplary embodiment of the present invention.

FIG. 8 is a perspective view showing a front pillar and a glass run lower inner reinforcement part of the side reinforcement structure of the vehicle body according to an exemplary embodiment of the present invention, and FIG. 9 is a perspective view showing a rear pillar and the glass run lower inner reinforcement part of the side reinforcement structure of the vehicle body according to an exemplary embodiment of the present invention.

Referring to FIG. 6 to FIG. 9, the side reinforcing structure of the vehicle body according to an exemplary embodiment of the present invention may further include a glass run lower outer reinforcement 60 disposed parallel to the glass run lower inner reinforcement 40, forming a glass passage 62 (see FIG. 14) between the glass run lower inner reinforcement 40 and the glass run lower outer reinforcement 60 and connecting the front pillar 20 and the rear pillar 30.

The glass run lower outer reinforcement 60 connects the front pillar 20 and the rear pillar 30 to increase the strength of the side of the vehicle body 10 together with the glass run lower inner reinforcement 40.

In addition, the glass run lower outer reinforcement 60 may prevent penetration of external materials into the occupant seat in the event of a vehicle side collision.

Figure 10:
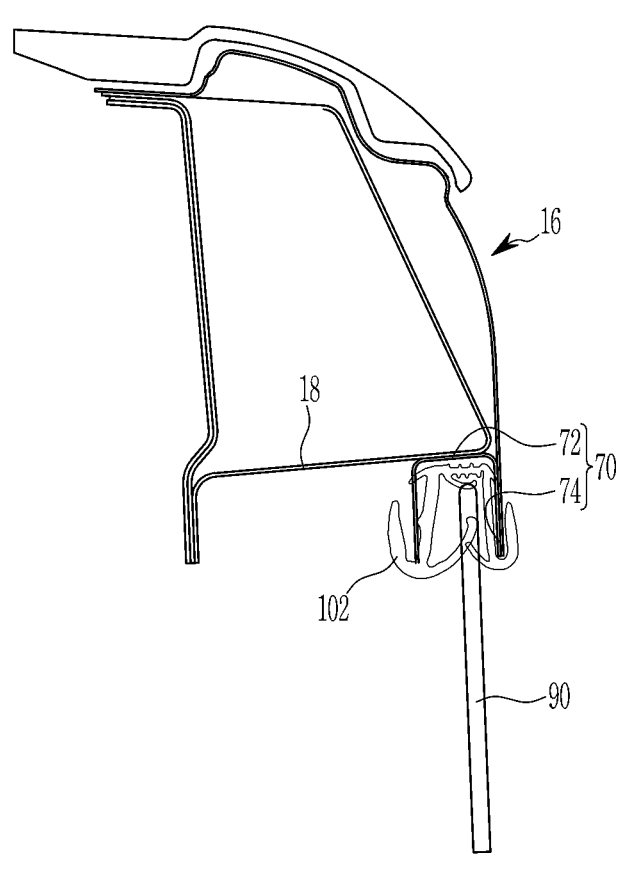
FIG. 10 is a cross-sectional view along the X-X line in FIG. 2.
Figure 11:
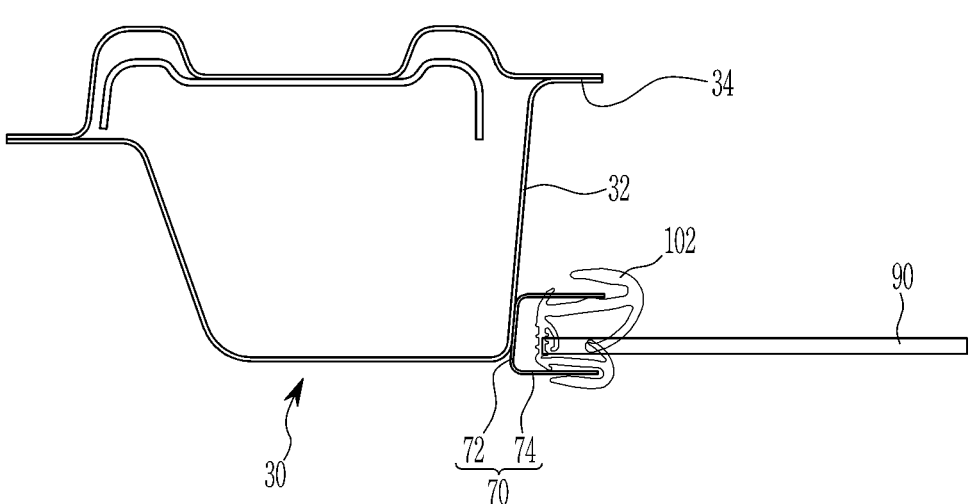
FIG. 11 is a cross-sectional view along line XI-XI in FIG. 2.

FIG. 10 is a cross-sectional view along the X-X line in FIG. 2, and FIG. 11 is a cross-sectional view along line XI-XI in FIG. 2.

Referring to FIG. 1 to FIG. 11, the side reinforcement structure of the vehicle body according to an exemplary embodiment of the present invention may further include a glass run upper reinforcement 70 that connects the front pillar 20 and the rear pillar 30 and is connected with the glass run lower inner reinforcement 40 and the glass run lower outer reinforcement 60.

The side reinforcing structure of the vehicle body according to an exemplary embodiment of the present invention further includes a roof rail side 16 disposed on an upper portion of the vehicle body 10 along the vehicle body length direction.

The glass run upper reinforcement 70 may be connected to the roof rail side 16.

That is, the glass run upper reinforcement 70 may connect the front pillar 20, the roof rail side 16, and the rear pillar 30 in an inverted "U" shape.

The glass run upper reinforcement 70, the front pillar 20, the rear pillar 30, the glass run lower inner reinforcement 40, and the glass run lower outer reinforcement 60 are connected to form a closed space surrounding the glass 90 of the passenger seat 13, so that the lateral strength of the vehicle body 10 may be increased.

The glass run upper reinforcement 70 may have a "U"-shaped cross-section shape including an upper reinforcement inner body 72 and an upper reinforcement outer body 74 bent from the upper reinforcement inner body 72 so that the glass 90 is inserted therein.

The glass 90 may be inserted into the "U" shaped cross-section of the glass run upper reinforcement 70, and the strength of the glass run upper reinforcement 70 may be increased by the "U" shaped cross-section shape.

The roof rail side 16 includes a lower surface 18 formed thereunder, and the upper reinforcement inner body 72 of the glass run upper reinforcement 70 may be firmly connected to the lower surface 18 of the roof rail side 16 by welding.

The side reinforcement structure of the vehicle body according to an exemplary embodiment of the present invention may further include a glass upper sealing 102 mounted on the upper reinforcement outer body 74.

When the glass 90 is closed, the glass upper sealing 102 elastically supports the glass 90 and blocks external foreign substances and water from entering into the vehicle.

FIG. 10 and FIG. 11 show that the glass upper sealing 102 is mounted on the lower part of the glass run upper reinforcement 70 under the roof rail side 16 and on the side part of the glass run upper reinforcement 70 corresponding to the rear pillar 30, but is not limited thereto, and it can also be mounted in a position corresponding to the front pillar 20.

That is, the glass upper sealing 102 may be mounted on the entire area of the glass run upper reinforcement 70 to seal the glass 90.

Referring to FIG. 8 and FIG. 9, the front pillar 20 includes a front pillar rear surface 22 formed toward the rear of the vehicle body, and the upper reinforcement inner body 72 of the glass run upper reinforcement 70 may be connected to the front pillar rear surface 22.

For example, the upper reinforcement inner body 72 of the glass run upper reinforcement 70 may be welded to the front pillar rear surface 22.

The rear pillar 30 includes a rear pillar front surface 32 formed toward the front of the vehicle body, and the upper reinforcement inner body 72 of the glass run upper reinforcement 70 may be connected to the rear pillar front surface 32.

For example, the upper reinforcement inner body 72 of the glass run upper reinforcement 70 may be welded to the rear pillar front surface 32.

The glass run lower inner reinforcement 40 and the glass run lower outer reinforcement 60 may be welded to the upper reinforcement outer body 74.

The glass run upper reinforcement 70 is connected with the front pillar 20 and the rear pillar 30 by welding, and the connection strength can be increased.

In addition, the upper reinforcement outer body 74 of the glass run upper reinforcement 70 is connected to the glass run lower inner reinforcement 40 and the glass run lower outer reinforcement 60 by welding to increase the connection strength.

In other words, the glass run upper reinforcement 70, the front pillar 20, the rear pillar 30, the glass run lower inner reinforcement 40, and the glass run lower outer reinforcement 60 are connected to form a closed space surrounding the glass 90 of the passenger seat 13. It is possible to increase the lateral strength of the vehicle body 10.

Figure 12:
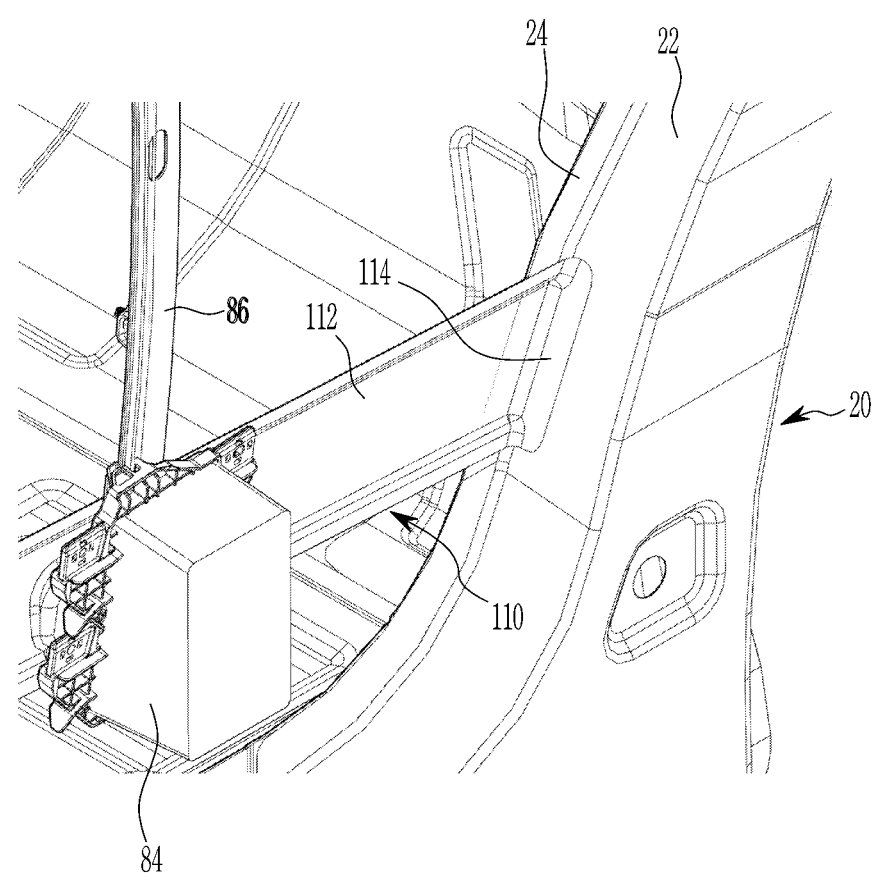
FIG. 12 and FIG. 13 are partial perspective views of a regulator lower reinforcement part of the side reinforcement structure of the vehicle body according to an exemplary embodiment of the present invention.
Figure 13:
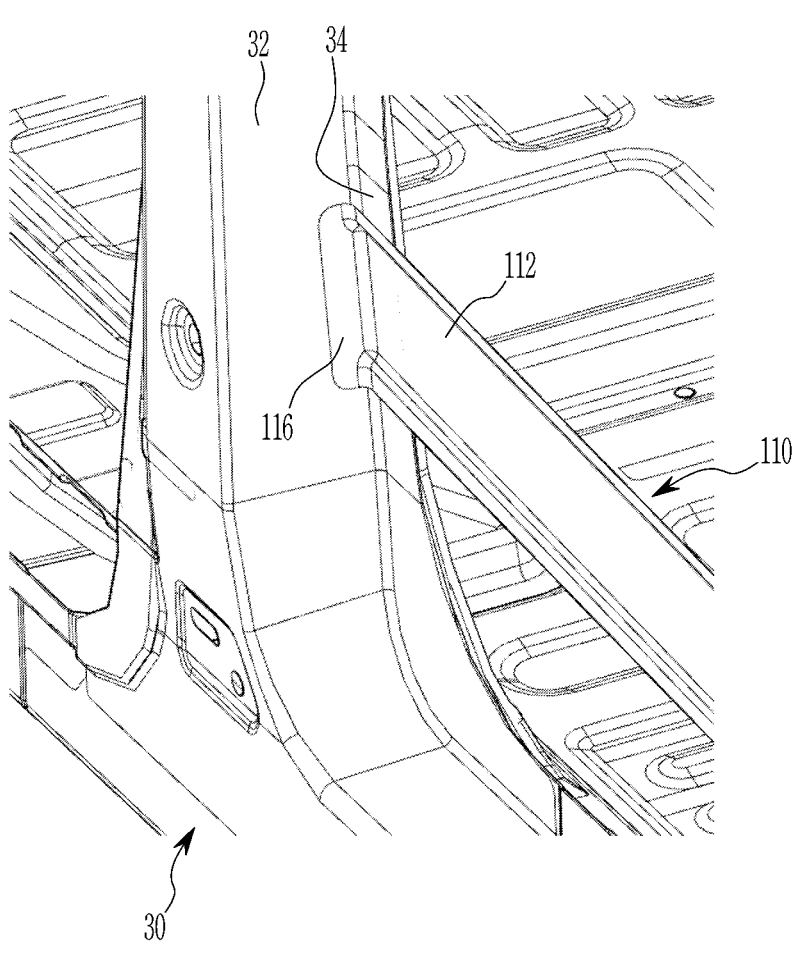

FIG. 12 and FIG. 13 are partial perspective views of a regulator lower reinforcement part of the side reinforcement structure of the vehicle body according to an exemplary embodiment of the present invention.

Referring to FIG. 3, FIG. 12, and FIG. 13, the regulator 80 includes a lower mounting portion 84, and the side reinforcing structure of the vehicle body according to the exemplary embodiment of the present invention may further include a regulator lower reinforcement 110 connecting the front pillar 20 and the rear pillar 30 and mounting the lower mounting portion 84 thereto.

The regulator 80 may further include a regulator body 86 connecting the upper mounting portion 82 and the lower mounting portion 84.

The regulator body 86 may be connected with the glass run lower inner reinforcement 40, the glass run lower outer reinforcement 60, and the regulator lower reinforcement 110 to improve vertical direction connection strength.

The front pillar 20 may include a front pillar inner flange 24 formed along the length direction of the vehicle body, and the rear pillar 30 may include a rear pillar inner flange 34 formed along the length direction of the vehicle body.

The regulator lower reinforcement 110 may include a regulator lower reinforcement body 112 connected to the front pillar inner flange 24 and the rear pillar inner flange 34 by welding and a regulator lower reinforcement front flange 114 and a regulator lower reinforcement rear flange 116 that are bent from the regulator lower reinforcement body 112 and connected to the front pillar rear surface 22 and the rear pillar front surface 32 by welding, respectively.

The front pillar inner flange 24 and the rear pillar inner flange 34 may increase the strength of the front pillar 20 and the rear pillar 30 by their shape.

In addition, the regulator lower reinforcement 110 is connected to the front pillar inner flange 24 and the rear pillar inner flange 34 in the width direction of the vehicle body 10 and connected to the front pillar rear surface 22 and the rear pillar front surface 32 in the length direction of the vehicle body 10, so that it may increase the lateral strength of the vehicle body.

Figure 14:
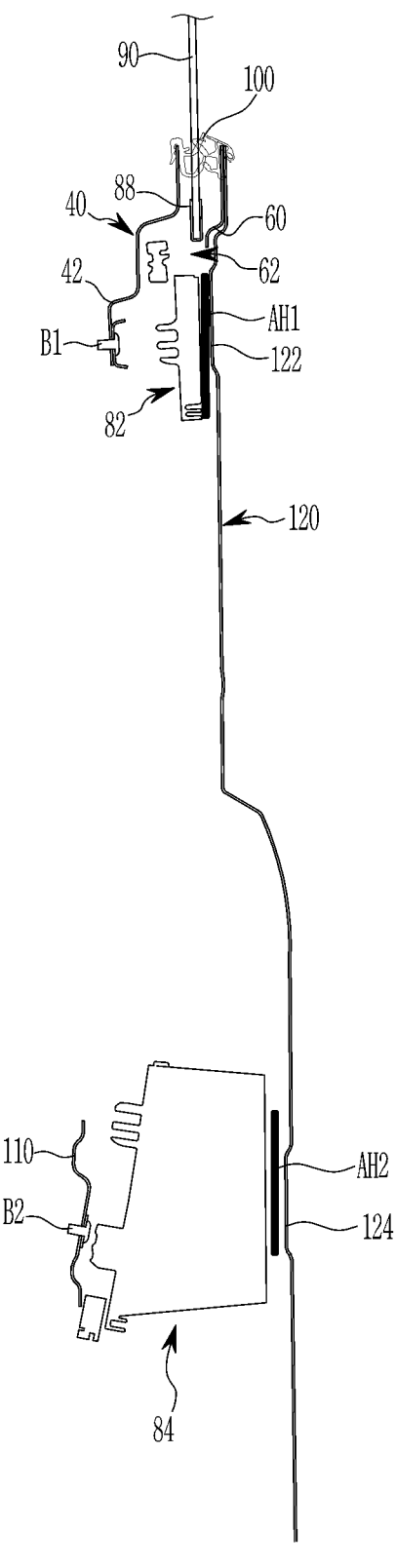
FIG. 14 is a cross-sectional view along the XIV-XIV line in FIG. 1.

FIG. 14 is a cross-sectional view along the XIV-XIV line in FIG. 1.

Referring to FIG. 14, the side reinforcing structure of the vehicle body according to an exemplary embodiment of the present invention may further include a glass lower sealing 100 inserted between the glass run lower inner reinforcement 40 and the glass run lower outer reinforcement 60.

The glass lower sealing 100 is mounted on an upper portion of the glass run lower inner reinforcement 40 and the glass run lower outer reinforcement 60 and may seal the glass 90, and the glass lower sealing 100 may block the inflow of external foreign substances or water.

FIG. 14 illustrates a glass support 88 that supports the glass 90, and when the regulator 80 operates, the glass support 88 supports and moves the glass 90 up and down.

Since the specific operation of the regulator 80 is obvious to those skilled in the art, a detailed description thereof will be omitted.

Referring to FIG. 1 and FIG. 14, the side reinforcing structure of the vehicle body according to an exemplary embodiment of the present invention may further include an outer skin 120 connected to the upper mounting portion 82 and the lower mounting portion 84 of the regulator 80.

Outer skin forming parts 122 and 124 are formed at positions corresponding to the upper mounting portion 82 and the lower mounting portion 84 of the regulator and the outer skin forming parts 122 and 124 are connected to the upper mounting portion 82 and the lower mounting portion 84 of the regulator, respectively.

For example, the outer skin forming parts 122 and 124 and the upper mounting portion 82 and the lower mounting portion 84 may be bonded through adhesives AH1 and AH2, respectively.

For example, referring to FIG. 1, the outer skin 120 connects the front pillar 20 and the rear pillar 30 and forms the exterior of the vehicle body 10 and is formed of a metal or non-metal material.

Referring to FIG. 14, the upper mounting portion 82 of the regulator 80 may be connected with the regulator mounting part 42 of the glass run lower inner reinforcement 40 with a bolt B1 and may be stably supported by combining with the outer skin 120 through the adhesive AH1.

In addition, the lower mounting portion 84 of the regulator 80 may be connected with the regulator lower reinforcement 110 with a bolt B2 and may be stably supported by combining with the outer skin 120 through the adhesive AH2.

According to the side reinforcing structure of the vehicle body according to an exemplary embodiment of the present invention, the power window or electric window is applied to the passenger seat to which the door is not applied, and the parts constituting the power window or electric window may reinforce the side portion of the vehicle body.

In addition, according to the side reinforcing structure of the vehicle body according to an exemplary embodiment of the present invention, a plurality of load paths are formed to facilitate load distribution upon vehicle collision.

That is, as shown in FIG. 2, the front pillar 20 and the glass run upper reinforcement 70 form an upper load path LP1, and the front pillar 20, the glass run lower inner reinforcement 40, and the glass run lower outer reinforcement 60 form a glass run load path LP2. And the front pillar 20 and the regulator lower reinforcement 110 form a regulator lower load path LP3, and a side sill 15 formed on the side of the vehicle body 10 and the front pillar 20 form a lower load path LP4.

While embodiments of the invention have been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A side reinforcing structure comprising:
   a front pillar;
   a rear pillar;
   a glass run lower inner reinforcement connecting the front pillar and the rear pillar; and
   a regulator comprising an upper mounting portion, wherein the regulator is connected to the glass run lower inner reinforcement through the upper mounting portion.

2. The side reinforcing structure of claim 1, wherein the glass run lower inner reinforcement comprises:
   a lower inner reinforcement body connecting the front pillar and the rear pillar;
   an inner reinforcement body bending portion bent from the lower inner reinforcement body; and
   a regulator mounting part on the lower inner reinforcement body and the inner reinforcement body bending portion to mount the upper mounting portion.

3. The side reinforcing structure of claim 2, wherein the glass run lower inner reinforcement further comprises an inner reinforcement front flange and an inner reinforcement rear flange connected with the front pillar and the rear pillar, respectively.

4. A side reinforcing structure comprising:
   a front pillar;
   a rear pillar;
   a glass run lower inner reinforcement connecting the front pillar and the rear pillar;
   a regulator comprising an upper mounting portion, wherein the regulator is connected to the glass run lower inner reinforcement through the upper mounting portion; and
   a glass run lower outer reinforcement disposed parallel to the glass run lower inner reinforcement to define a glass passage between the glass run lower inner reinforcement and the glass run lower outer reinforcement and connecting the front pillar and the rear pillar.

5. The side reinforcing structure of claim 4, further comprising a glass lower sealing inserted between the glass run lower inner reinforcement and the glass run lower outer reinforcement.

6. The side reinforcing structure of claim 4, further comprising a glass run upper reinforcement connecting the front pillar and the rear pillar and connected with the glass run lower inner reinforcement and the glass run lower outer reinforcement.

7. The side reinforcing structure of claim 6, wherein the glass run upper reinforcement has a "U"-shaped cross-section shape including an upper reinforcement inner body and an upper reinforcement outer body bent from the upper reinforcement inner body, and wherein a glass is inserted therein.

8. The side reinforcing structure of claim 7, further comprising a glass upper sealing mounted on the upper reinforcement outer body.

9. The side reinforcing structure of claim 7, further comprising a roof rail side disposed on an upper portion of a vehicle body along a vehicle body length direction, wherein the upper reinforcement inner body of the glass run upper reinforcement is connected to a lower surface of the roof rail side by a weld.

10. The side reinforcing structure of claim 7, wherein:
   the front pillar comprises a front pillar rear surface facing toward a rear of a vehicle body;
   the rear pillar comprises a rear pillar front surface facing toward a front of the vehicle body; and
   the upper reinforcement inner body of the glass run upper reinforcement is coupled to the front pillar rear surface and the rear pillar front surface by welds.

11. The side reinforcing structure of claim 7, wherein the glass run lower inner reinforcement and the glass run lower outer reinforcement are coupled to the upper reinforcement outer body by welds.

12. The side reinforcing structure of claim 6, further comprising a regulator lower reinforcement connecting the front pillar and the rear pillar, wherein the regulator comprises a lower mounting portion mounted on the regulator lower reinforcement.

13. The side reinforcing structure of claim 12, wherein:
   the front pillar comprises a front pillar inner flange disposed along a length direction of a vehicle body and a front pillar rear surface facing toward a rear of the vehicle body;
   the rear pillar comprises a rear pillar inner flange disposed along the length direction of the vehicle body and a rear pillar front surface facing toward a front of the vehicle body; and
   the regulator lower reinforcement comprises:
      a regulator lower reinforcement body connected to the front pillar inner flange and the rear pillar inner flange by welds; and
      a regulator lower reinforcement front flange and a regulator lower reinforcement rear flange bent from the regulator lower reinforcement body and respectively connected to the front pillar rear surface and the rear pillar front surface by welds.

14. A vehicle comprising:
   a vehicle body comprising a front pillar and a rear pillar;
   a glass run lower inner reinforcement extending along a length direction of the vehicle body and connecting the front pillar and the rear pillar;
   a glass mounted on a side of the vehicle body between the front pillar and the rear pillar and above the glass run lower inner reinforcement; and
   a regulator extending in a vehicle height direction and comprising an upper mounting portion and a lower mounting portion, wherein the regulator is connected to the glass run lower inner reinforcement through the upper mounting portion, and wherein the regulator is configured to move the glass vertically.

15. The vehicle of claim 14, wherein the glass run lower inner reinforcement comprises:
   a lower inner reinforcement body connecting the front pillar and the rear pillar;

an inner reinforcement body bending portion bent from the lower inner reinforcement body; and a regulator mounting part on the lower inner reinforcement body and the inner reinforcement body bending portion to mount the upper mounting portion.

16. The vehicle of claim 15, wherein the glass run lower inner reinforcement further comprises an inner reinforcement front flange and an inner reinforcement rear flange connected with the front pillar and the rear pillar, respectively.

17. The vehicle of claim 15, further comprising a glass run lower outer reinforcement connecting the front pillar and the rear pillar and disposed parallel to the glass run lower inner reinforcement to define a glass passage for the glass between the glass run lower inner reinforcement and the glass run lower outer reinforcement.

18. The vehicle of claim 17, further comprising a glass run upper reinforcement connecting the front pillar and the rear pillar and connected with the glass run lower inner reinforcement and the glass run lower outer reinforcement, wherein the glass run upper reinforcement has a "U"-shaped cross-section shape including an upper reinforcement inner body and an upper reinforcement outer body bent from the upper reinforcement inner body, and wherein the glass is inserted therein.

19. The vehicle of claim 17, further comprising:

a regulator lower reinforcement connecting the front pillar and the rear pillar, wherein the lower mounting portion of the regulator is mounted on the regulator lower reinforcement; and a glass run upper reinforcement connecting the front pillar and the rear pillar and connected with the glass run lower inner reinforcement and the glass run lower outer reinforcement, wherein:

the front pillar comprises a front pillar inner flange disposed along the length direction of the vehicle body and a front pillar rear surface facing toward a rear of the vehicle body, the rear pillar comprises a rear pillar inner flange disposed along the length direction of the vehicle body and a rear pillar front surface facing toward a front of the vehicle body, and the regulator lower reinforcement comprises:

a regulator lower reinforcement body connected to the front pillar inner flange and the rear pillar inner flange by welds, and a regulator lower reinforcement front flange and a regulator lower reinforcement rear flange bent from the regulator lower reinforcement body and respectively connected to the front pillar rear surface and the rear pillar front surface by welds.

20. The side reinforcing structure of claim 1, further comprising a glass run lower outer reinforcement disposed parallel to the glass run lower inner reinforcement and a glass lower sealing inserted between the glass run lower inner reinforcement and the glass run lower outer reinforcement.

* * * * *